United States Patent [19]

Seifert et al.

[11] Patent Number: 5,085,478
[45] Date of Patent: Feb. 4, 1992

[54] CUSHIONING STEP FOR A SHOVEL AND THE LIKE

[75] Inventors: Charles A. Seifert, Bexley; David R. Bonnes, Westerville, both of Ohio

[73] Assignee: The Union Fork & Hoe Company, Columbus, Ohio

[21] Appl. No.: 565,487

[22] Filed: Aug. 10, 1990

[51] Int. Cl.⁵ .............................................. A01B 1/00
[52] U.S. Cl. ..................................................... 294/60
[58] Field of Search .............. 294/49, 51, 54.5, 55–57, 294/59, 60; 15/257.5; 37/265, 285; 172/371; 173/30; 254/1, 131.5; 267/136, 137, 140, 145, 153

[56] References Cited

U.S. PATENT DOCUMENTS

| | | | |
|---|---|---|---|
| 332,132 | 12/1885 | Anthony | 294/60 |
| 449,568 | 3/1891 | Omlor | 294/60 |
| 767,739 | 8/1904 | Davis | 294/60 |
| 810,488 | 1/1906 | Jarvis | 294/60 |
| 836,541 | 11/1906 | Spriggs | 294/60 X |
| 952,140 | 3/1910 | Roland et al. | 294/60 |
| 953,245 | 3/1910 | Walsh | 294/60 |
| 1,003,808 | 9/1911 | Sanderson | 294/60 |
| 1,058,819 | 4/1913 | Walsh | 294/60 |
| 1,097,313 | 5/1914 | Gregory | 294/60 |
| 1,138,018 | 5/1915 | Siedow | 294/60 |
| 1,166,427 | 1/1916 | Bradley | 294/60 |
| 1,223,555 | 4/1917 | Benton | 294/60 |
| 1,531,751 | 3/1925 | Mena | 294/60 |
| 1,658,963 | 2/1928 | Bergquist | 294/60 |
| 2,829,414 | 4/1958 | Thomas . | |

FOREIGN PATENT DOCUMENTS

| | | | |
|---|---|---|---|
| 103034 | 2/1938 | Australia | 294/60 |
| 166078 | 6/1950 | Fed. Rep. of Germany | 294/60 |
| 369590 | 3/1939 | Italy | 294/60 |
| 118318 | 3/1947 | Sweden | 294/60 |
| 17143 | of 1905 | United Kingdom | 294/60 |
| 2132061 | 7/1984 | United Kingdom | 294/60 |

OTHER PUBLICATIONS

A. M. Leonard, Inc., "Rubber Foot Pad", p. 5, advertisement brochure.

Primary Examiner—Johnny D. Cherry
Attorney, Agent, or Firm—Vorys, Sater, Seymour, & Pease

[57] ABSTRACT

The cushioning step for the blade of a tool, according to the invention, has an elongated elastomeric member having an axially-extending, blade-engaging, generally L-shaped slot, oriented so that the step may be placed on the top edge of the blade of a tool wherein the blade is positioned in the slot. The slot is located intermediate the opposed side faces of the stop to define opposed saddle portions which rest on the opposed sides of the blade. A generally horizontally-extending portion of the L-shaped slot accommodates the blade-top construction of a forwardly-turned shovel. An inwardly-turned projection is located at the lower portion of the slot for providing a line contact with the front-surface of the blade. The step further includes a pair of axially-extending, clip-receiving openings located on opposite sides of the blade-engaging slot for receiving the legs of a bifurcated clip for securing the step to the blade. Preferably, the clip is gently curved to accommodate the similar curve of the shovel blade. The axis of the blade-engaging slot is orientated so that when the step is properly positioned, the axis intersects the upper surface at approximately its midpoint.

12 Claims, 2 Drawing Sheets

1

CUSHIONING STEP FOR A SHOVEL AND THE LIKE

BACKGROUND OF THE INVENTION

This invention relates to a cushioning step for a garden tool, such as a shovel or the like. More particularly, this invention relates to a cushioning step provided as an accessory for pre-owned garden tools of the type described, wherein the step is easily secured to the top of a blade by a clip which is provided with the step as a unit. Still more particularly, this invention relates to an extruded, elastomeric cushioning step for a garden tool which is efficiently manufactured for easy installation by a clip for securing the step to a blade. Still more particularly, this invention relates to a combination of a garden tool, a cushioning step, and a bifurcated clip for securing the step to the garden tool.

Garden tools such as shovels, spades, forks, lawn edging tools, and other tools having an earth-penetrating blade have in the prior art sometimes been provided with a cushioning step for the upper surface of the blade. In use, such tools are urged into the ground by pressure from the sole of a boot, shoe, or other item of footwear. When significant pressure is exerted by the foot on the relatively narrow upper surface of the blade of the tool, very high pressures are developed which tend to destroy the footwear and in extreme cases injure the foot. Thus, the prior art in the past has developed a number of types of steps for such tools.

In the early 1900's, such steps or protectors were generally made of metal which raised problems of securing the step to the blade. Generally, such steps were secured to the blade by a fastening member, such as a bolt or a rivet extending transversely through the top of the shovel blade. Alternatively, the steps were secured to the blade by friction, for example, but this approach was not satisfactory in that the step tended to pivot forwardly from the force of the foot of the user. In time, therefore, the step was loosened and thus needed replacement.

Thus, the art has produced a number of cushioning steps of various designs and configurations which have been relatively complex from a manufacturing standpoint. It has thus been a continuing problem in this art to provide a cushioning step for a blade of a tool, such as a shovel, which is convenient and economical to manufacture. While it has been desired to provide such a step made from an elastomeric material, fastening the step to the tool has continued to be a problem. Use of a fastening member adds a disproportionately high cost to the tool. Use of adhesives for adhering the step to the blade has not been satisfactory from a standpoint of longevity and replaceability. And, prior efforts to merely place the member on the blade for a frictional fit have not proved desirable for a number of reasons. Thus, on balance, the use of a cushioning step has not found significant favor in the current marketplace so that the need for an improvement in step constructions has continued.

Accordingly, it is an overall objective of this invention to provide a cushioned step made from an elastomeric member which is attached to the blade of a garden tool such as a shovel by a bifurcated clip, whereby the tool, the step, and the clip are sold as a unit from the manufacturer.

It is another objective of this invention to provide a cushioned step of the type described with a bifurcated clip as a unit for retrofitting existing garden tools.

It is another objective of this invention to provide an elongated extruded elastomeric member having a slot for engaging the top of a blade of a shovel whereby the member is secured to the blade by a bifurcated clip inserted into openings in the member on opposed sides of the shovel blade.

These and other objectives of the invention will become apparent from a review of the specification which follows, taken in conjunction with the accompanying drawings.

BRIEF SUMMARY OF THE INVENTION

Directed to achieving the foregoing objectives and overcoming the problems with prior art steps for garden tools, the cushioning step for the blade of a tool, according to the invention, has an elongated elastomeric member having an axially-extending, blade-engaging, generally L-shaped slot, oriented so that the step may be placed on the top edge of the blade of a tool wherein the blade is positioned in the slot. The slot is located intermediate the opposed side faces of the step to define opposed saddle portions which rest on the opposed sides of the blade. A generally horizontally-extending portion of the L-shaped slot accommodates the blade-top construction of a forwardly-turned shovel. An inwardly-turned projection is located at the lower portion of the slot for providing a line contact with the front-surface of the blade.

The step further includes a pair of axially-extending, clip-receiving openings located on opposite sides of the blade-engaging slot for receiving the legs of a bifurcated clip for securing the step to the blade. Preferably, the clip is gently curved to accommodate the similar curve of the shovel blade. The side faces of the step merge into a foot-receiving upper surface which may be corrugated for receiving a foot of the user. The rearward face of the step merges with a tapered lower section which narrows toward its lower edge to merge aesthetically with the rear surface of the blade and to avoid dirt buildup on the step. The forward face of the step is defined by the forwardmost-extending portion of the step which accommodates the generally horizontal leg of the slot and curves to a narrower lower portion.

The axis of the blade-engaging slot is oriented so that when the step is properly positioned, the axis intersects the upper surface at approximately its midpoint. With such a construction, the tendency of the step to rotate forwardly is resisted by the balanced masses of material forward and rearward of the blade upper edge.

A method of installing the step on pre-owned shovels is also described.

DETAILED DESCRIPTION OF THE PREFERRED EMBODIMENTS

Figure 1:
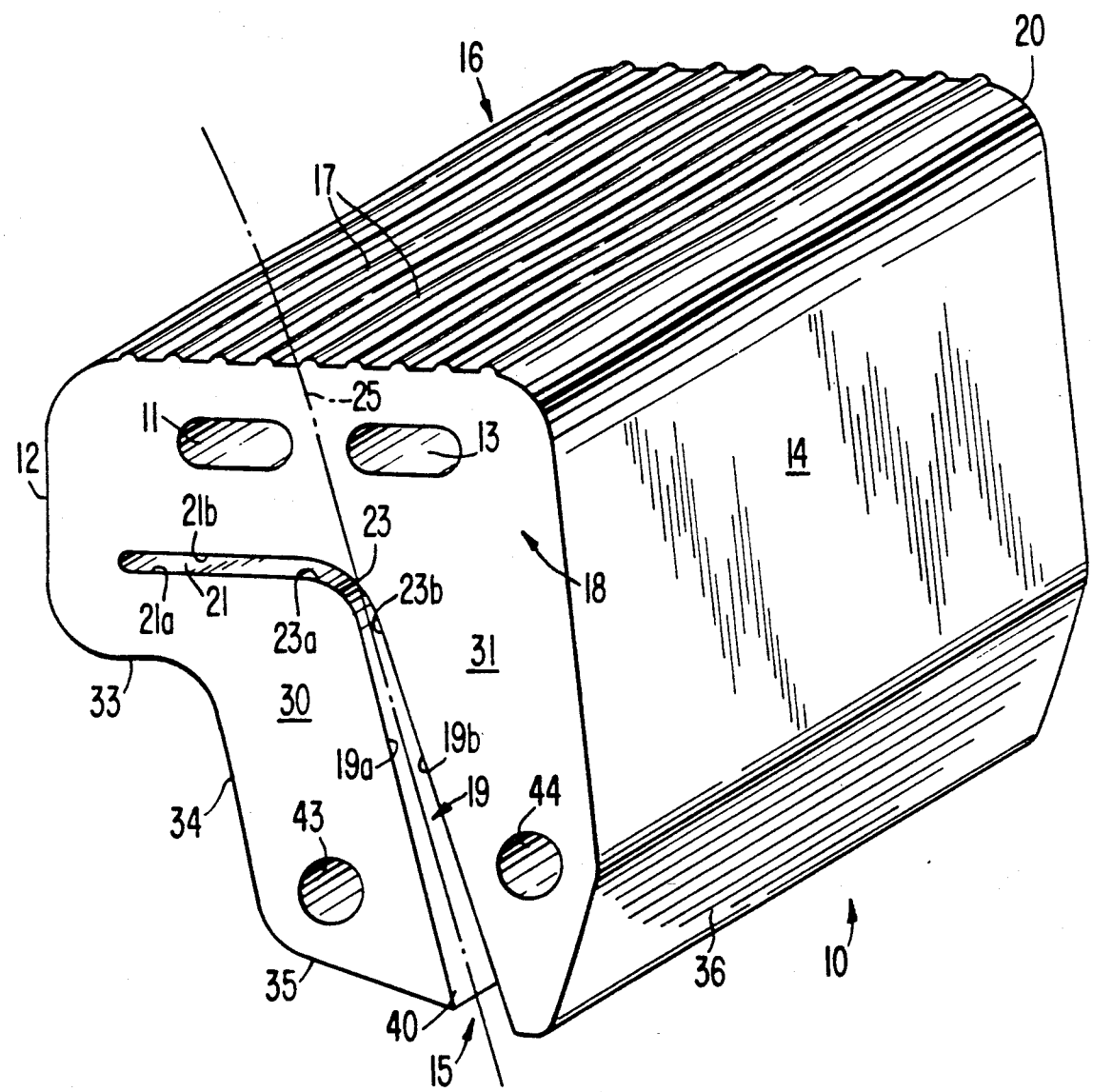
FIG. 1 is a perspective view of a cushioning step according to the invention.
Figure 2:
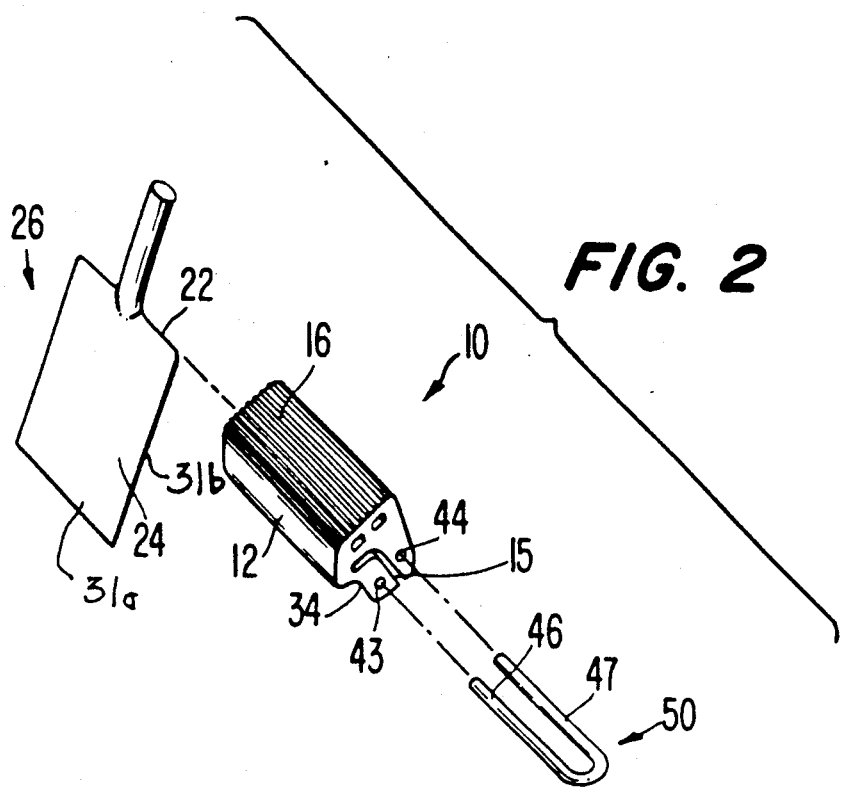
FIG. 2 is an exploded perspective view of the step and clip according to the invention secured to a forward-turned shovel blade.

A cushioning step according to the invention is shown generally at the reference numeral 10. The step is defined by a forward face 12 and a rearward face 14 connected to an upper foot-engaging surface 16 preferably having a plurality of foot-engaging corrugations 17. The axial length of the step 10 is defined by an opposed pair of end faces 18 and 20. The length of the step is such that it can fit on the upper surface 22 of a blade 24 of a garden tool 26, such as a shovel, as shown in FIG. 2. The symmetrical structure of the step 10 according to the invention permits its use on either the left side of the top 22 of the shovel blade 24, as shown in FIG. 2, or on the right side.

The step 10 is made from a continuous elastomeric extrusion of a suitable elastomer, such as a hard rubber having a hardness in a range of about 50 to about 100 durometer, and preferably 70 durometer. A hardness in this range is a important aid to resisting a tendency of the step 10 to roll or pivot when in use. A feature of the invention, as will be discussed, is that all functional openings in the step 10 are elongated in the direction of the axis of the step, and in the direction of its extrusion, thus permitting a continuous extrusion which is cut transversely to a desired length.

The step 10 includes a pair of axially-extending openings 11 and 13 near the upper surface 16. The openings 11 and 13 provide for resilience near the top of the step 10, aiding the resilience of the elastomer and thus adding to the cushioning effect of the step 10 when positioned on a shovel 26.

The step 10 includes a generally L-shaped slot 15 having an obliquely-oriented leg 19 and a generally horizontally-extending leg 21 which merge together through a curved portion 23 to form a continuous slot. The leg 19 is angled along an axis shown by the reference numeral 25 which intersects the upper surface 16 at about the midpoint between the faces 12 and 14 of the step 10. This orientation is a significant feature of the invention in that this structure resists the tendency of the step to pivot in a forward or in a reverse direction when positioned on the top edge 22 of the blade 24 of the shovel 26. The location of the leg 19 also separates the step 10 into a forward portion 30 and a rearward portion 31 which respectively lie on the forward and rearward surfaces 30a and 31a of the blade 24 of the shovel 26.

The surface 12 curves gently from a forwardmost location through a portion 33 to a generally downwardly-extending portion 34 terminating in a lower, generally horizontally-extending portion 35 which in turn merges with a forward face 19a of the slot 19. Thus, the forward portion 30 of the step 10 is defined by the surfaces 12, 33, 34, 35, 19a, 23a, 21a, and 21b together with about half of the surface 16. The surface 14 merges with a tapered surface 36 at its lower portion. Thus, the rearward portion of the step 10 is defined by the surfaces 14, 36, 19b, 23b, and about half of the upper surface 16.

An inwardly-facing projection 40 is located respectively on the lower portion of the surface 19a and provides substantially a line contact with the front surface of the shovel blade 24.

Figure 3:
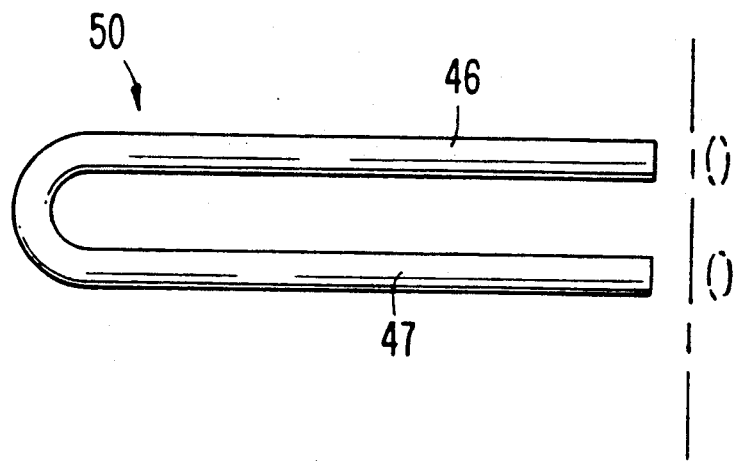
FIG. 3 is a plan view of the clip according to the invention for securing the step to a shovel blade.

The step 10 further defines a pair of clip-receiving openings 43 and 44 respectively located in the forward and rearward portions 30, 31 of the step 10. The openings 43, 44 receive the opposed legs 46, 47 of the bifurcated clip 50 as shown in FIG. 3. When positioned as shown in FIG. 2, the clip 50 secures the step to the shovel 26. The legs 46, 47 of the clip 50 are curved at a radius of about 5 in. to match the general curvature of the shovel blade 24. Preferably, the clip 50 is made from a hard-drawn spring steel to provide a spring loading of the step 10.

While the step 10 is shown as developed for a forward-turned shovel (FTS), the principles of the invention are applicable to a rearwardly-turned shovel, i.e. where the top surface 22 of the shovel blade 24 is turned toward to the rear.

An advantage of the step and clip according to the invention is that the members can be applied at the point of manufacture of the shovel, so that the shovel is sold with the step and clip attached. However, the step and clip can also be provided as a unit for retrofitting garden tools, including shovels, which currently exist without such steps. When so applied, the step 10 is provided and attached to the upper portion of the blade 24 of the shovel 26 so that the top surface 22 is located at about the portion 23b of the slot 19. That initial step can be achieved by sliding the step from the side as shown generally in FIG. 2 or from the top downwardly. Either way may require gentle hammering to fix the step 10 in the desired final position for insertion of the clip 50 in the openings 43, 44 as shown.

Although the present invention has been shown and described with respect to certain preferred embodiments, various changes and modifications which are apparent to a person skill in the art to which the invention pertains are deemed to lie within the spirit and scope of the invention as defined in the appended claims.

What is claimed is:

1. A step for a foot-engaging portion of a garden tool having an earth-penetrating blade, such as a shovel, comprising:
    an elongated, elastomeric member having a body generally defined by an upper, foot-engaging surface, a forward surface, a rearward surface, a lower surface, and a pair of opposed end surfaces, said body being generally divided into a forward portion and a rearward portion by a blade-receiving slot therein, said slot having a generally L-shaped configuration; and
    a pair of elongated, clip-receiving slots in said body respectively located in the forward and rearward portions of said body for receiving a clip when said step member is positioned, on the blade of the garden tool so that the blade is in said blade-receiving slot.

2. The step as set forth in claim 1 wherein said blade-receiving slot has a leg which receives said blade in a way wherein an axis of the blade-receiving slot intersects the plane of said foot-engaging surface at about a midpoint thereof.

3. The step as set forth in claim 1 wherein the hardness of said step is in a range of about 50 to about 100 durometer.

4. The step as set forth in claim 3 wherein the hardness of said step is about 70 durometer.

5. The step as set forth in claim 1 further including at least one axially-extending opening in said step near said foot-engaging surface so that cushioning is provided by said step.

6. The step as set forth in claim 1 wherein said L-shaped slot has a generally forward-extending horizontal leg for accommodating a forwardly-turned shovel blade.

7. The step as set forth in claim 1 wherein said blade-receiving slot has at a lowermost portion thereof an inwardly turned projection for mating with a blade of said shovel.

8. The step as set forth in claim 1 further including a clip having legs arranged for insertion into said clip-receiving slots in said step.

9. The step as set forth in claim 8 wherein said blade-receiving slot on said step receives a top surface on a shovel blade.

10. The step as set forth in claim 9 wherein said legs of said clip are curved at about a radius the same as a predetermined curved radius of a blade.

11. In combination,
a garden tool having a blade with a foot-engaging upper surface;
a step, having an elongated, elastomeric member having a body generally defined by an upper, foot-engaging surface, a forward surface, a rearward surface, a lower surface, and a pair of opposed end surfaces, said body being generally divided into a forward portion and a rearward portion by a blade-receiving slot therein, said slot having a generally L-shaped configuration and a pair of elongated clip-receiving openings in said body located in said forward and rearward portions; and
a clip having a pair of spaced opposed legs for engaging said clip-receiving openings.

12. A method of applying a step having an elongated, elastomeric member having a body generally defined by an upper, foot-engaging surface, a forward surface, a rearward surface, a lower surface, and a pair of opposed end surfaces, said body being generally divided into a forward portion and a rearward portion by a blade-receiving slot therein, a pair of elongated clip-engaging openings in said body located in the forward and rearward portions, said slot having a generally L-shaped configuration, to a garden tool having a blade with an upper foot-engaging surface, comprising the steps of:
applying said step to said blade so that an upper portion of said blade is engaged in said blade-receiving slot; and
inserting opposed legs of a clip into said clip-engaging openings in said step.

* * * * *